United States Patent
Ozaki et al.

(10) Patent No.: US 9,499,879 B2
(45) Date of Patent: Nov. 22, 2016

(54) METHOD FOR PRODUCING HIGH-PURITY COBALT SULFATE AQUEOUS SOLUTION

(71) Applicant: SUMITOMO METAL MINING CO., LTD., Tokyo (JP)

(72) Inventors: Yoshitomo Ozaki, Niihama (JP); Takayuki Nakai, Niihama (JP); Shinichi Heguri, Niihama (JP); Hideki Ohara, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 47 days.

(21) Appl. No.: 14/353,548

(22) PCT Filed: Oct. 17, 2012

(86) PCT No.: PCT/JP2012/076851
§ 371 (c)(1),
(2) Date: Apr. 23, 2014

(87) PCT Pub. No.: WO2013/061848
PCT Pub. Date: May 2, 2013

(65) Prior Publication Data
US 2014/0294703 A1 Oct. 2, 2014

(30) Foreign Application Priority Data

Oct. 24, 2011 (JP) ................. 2011-232419
Jun. 25, 2012 (JP) ................. 2012-141815

(51) Int. Cl.
*C22B 3/00* (2006.01)
*C01G 51/10* (2006.01)
(Continued)

(52) U.S. Cl.
CPC ........... *C22B 23/0461* (2013.01); *C01G 51/10* (2013.01); *C22B 3/0005* (2013.01);
(Continued)

(58) Field of Classification Search
CPC ..... C01B 17/901; C01B 17/903; C01G 1/10; C01G 1/40–1/64; C22B 23/043; C22B 23/0407; C22B 23/0453; C22B 23/0461; C22B 3/00–3/0098
See application file for complete search history.

(56) References Cited

U.S. PATENT DOCUMENTS 6,149,885 A * 11/2000 Makino ............... C22B 23/0453
423/139
6,835,228 B1 * 12/2004 Lin ....................... C22B 3/0005
205/583
2004/0050212 A1 3/2004 Cheng et al.

FOREIGN PATENT DOCUMENTS

| JP | 01-194988 A | 8/1989 |
| JP | 07-108281 A | 4/1995 |
| JP | 2000-017347 A | 1/2000 |
| JP | 2001-288515 A | 10/2001 |
| JP | 2007-270262 A | 10/2007 |

(Continued)

OTHER PUBLICATIONS

D. Darvishi et al., "Extraction of Manganese from Solutions containing Zinc and Cobalt by D2EHPA and D2EHPA-CYANEX® 272 or CYANEX® 302 mixtures", International Solvent Extraction Conferences, Jan. 1, 2005, pp. 1-6.

(Continued)

*Primary Examiner* — Anthony J Zimmer
(74) *Attorney, Agent, or Firm* — Locke Lord LLP

(57) ABSTRACT

Disclosed herein is a method for easily and efficiently removing manganese from an aqueous acidic solution of sulfuric acid containing cobalt and manganese at low cast to obtain a high-purity cobalt sulfate aqueous solution usable as a raw material for lithium ion secondary batteries. The high-purity cobalt sulfate aqueous solution is obtained by mixing an aqueous acidic solution of sulfuric acid containing cobalt and manganese (aqueous phase) with an acidic organic extractant (organic phase) while adjusting the pH of the aqueous acidic solution of sulfuric acid to a value in a range between 2 and 4 with a pH adjuster such as sodium hydroxide to extract manganese into the organic phase. The acidic organic extractant to be used is preferably diluted so that the concentration of di-2-ethylhexyl phosphate is 10 to 30 vol %.

14 Claims, 2 Drawing Sheets

(51) Int. Cl.
    *H01M 10/54*     (2006.01)
    *H01M 4/505*     (2010.01)
    *H01M 4/525*     (2010.01)
    *C22B 3/26*     (2006.01)
    *C22B 7/00*     (2006.01)
    *H01M 10/052*     (2010.01)

(52) U.S. Cl.
    CPC ............. *C22B 7/007* (2013.01); *H01M 4/505* (2013.01); *H01M 4/525* (2013.01); *H01M 10/54* (2013.01); *C01P 2006/80* (2013.01); *H01M 10/052* (2013.01); *Y02E 60/122* (2013.01); *Y02P 10/234* (2015.11); *Y02P 70/54* (2015.11); *Y02W 30/84* (2015.05)

(56) References Cited

FOREIGN PATENT DOCUMENTS

JP      2010-168237 A      8/2010
WO      WO-02/22896 A1      3/2002

OTHER PUBLICATIONS

Ying-Chu Hoh et al., "The Separation of Manganese From Cobalt by D2EHPA", Hydrometallurgy, vol. 12, No. 3, Jul. 1, 1984, pp. 375-386.

Supplementary European Search Report dated May 21, 2015, issued for the European patent application No. 12844253.0.

International Search Report dated Dec. 18, 2012, issued for PCT/JP2012/076851.

* cited by examiner

METHOD FOR PRODUCING HIGH-PURITY COBALT SULFATE AQUEOUS SOLUTION

TECHNICAL FIELD

The present invention relates to a method in which manganese is separated from a sulfuric acid solution containing manganese and cobalt to obtain a high-purity cobalt sulfate aqueous solution that has a low manganese concentration and can be used as a raw material for lithium ion secondary batteries.

BACKGROUND ART

Cobalt is a valuable metal used in heat-resistant alloys etc. and is recently used as a raw material for lithium ion secondary batteries, and therefore its application is expanding. Further, cobalt is mostly present in nickel ore such as nickel oxide ore in minute amounts, and is therefore obtained as cobalt metal or cobalt salts by separating nickel through the processes of dry or wet smelting and extraction.

For example, when cobalt is obtained by dry smelting, nickel ore is smelted to produce nickel matte in which nickel and cobalt are concentrated. Then, the nickel matte is subjected to leaching with mineral acid to obtain an acid solution containing nickel and cobalt, and then nickel is separated and recovered from the acid solution by a method such as solvent extraction to obtain cobalt as cobalt metal or cobalt sulfate.

Recently, wet smelting is also performed to obtain cobalt as a cobalt sulfate aqueous solution. More specifically, nickel ore is subjected to leaching with sulfuric acid under high temperature and high pressure to obtain a leachate, and a sulfating agent is added to the leachate to obtain a mixed sulfide containing nickel and cobalt. Then, the mixed sulfide is treated in the same manner as the above-described nickel matte to separate and recover nickel to obtain cobalt as a cobalt sulfate aqueous solution. Such a wet smelting method using high temperature and high pressure has the advantage that lower-grade ore can be treated as compared to the above-described dry smelting method.

When added to alloys or used as a battery material, the thus obtained cobalt is required to be high grade by separating impurities as much as possible to ensure desired performance. Particularly, in the case of the above-described wet smelting method, the impurity concentration, especially manganese concentration, of a cobalt sulfate aqueous solution obtained by separating and recovering nickel by extraction is generally required to be suppressed to a level of about several hundreds of ppm or lower in order to use the cobalt sulfate aqueous solution as a raw material.

Nickel oxide ore contains, in addition to nickel and cobalt, impurities such as manganese, magnesium, aluminum, zinc, chromium, etc. However, wet smelting has a problem with the separation of such impurities. For example, in the case of the above-described wet smelting method, manganese is leached in an acid solution together with nickel and cobalt, is distributed also to a sulfide, and shows the same behavior as cobalt also in solvent extraction performed to separate nickel and cobalt from each other, and therefore an aqueous solution containing not only cobalt but also manganese is finally obtained.

From the above fact, a cobalt sulfate aqueous solution obtained by separating and recovering nickel by wet smelting contains a considerable concentration of manganese as an impurity and is therefore difficult to add to alloys or use as a raw material for lithium ion secondary batteries. It is to be noted that in the case of dry smelting, manganese can be effectively separated as slag produced by smelting and therefore the effect of manganese on subsequent steps is small.

Various methods for removing manganese from an aqueous solution are known and examples thereof include a neutralization method, a sulfurization method, a contact filtration method, an ion exchange method, and an adsorption method. Among these methods, the neutralization method has been generally and widely used because it is an easy and reliable method for industrially treating manganese. The neutralization method is a method in which an alkaline neutralizer such as sodium hydroxide, potassium hydroxide, or calcium hydroxide is added to an aqueous solution containing manganese to adjust pH to 9 to 10 to remove manganese ions in the form of hydroxide in such an alkaline region.

However, when such a neutralization method is used to remove manganese ions in an aqueous solution in the form of hydroxide, it is difficult to separate manganese ions from, for example, metal ions precipitated as hydroxide at a pH of at most 9. Further, when manganese needs to be separated from a solution containing a high concentration of cobalt, there is a case where part of cobalt is coprecipitated when a manganese precipitate is formed by neutralization, and therefore cannot be recovered and is lost.

As a method for solving such a problem, Patent Literature 1 discloses a method in which permanganate is added as an oxidizer to water containing manganese and pH is maintained at 3 to 8 to oxidize divalent manganese ions to tetravalent manganese ions so that insoluble manganese dioxide is formed as a precipitate. However, this method has the problem of a great increase in cost because permanganate needs to be added in an amount equivalent to or more than the amount of divalent manganese ions, and in addition, a heavy metal chelator needs to be further added to remove excess permanganate.

It is to be noted that a chlorine-based oxidizer such as chlorine gas or sodium hypochlorite is inexpensive, but when such a chlorine-based oxidizer is used, there is a fear that chlorine remains in a cobalt sulfate solution. This results in chlorine contamination of cobalt sulfate crystallized out of the solution in which chlorine remains, and therefore such cobalt sulfate cannot be used in applications such as secondary battery materials required to have high purity.

On the other hand, a method is known in which nickel or cobalt is separated from a leachate by extraction. For example, Patent Literature 2 discloses a method for separating manganese contained in an acidic solution from cobalt by extraction using organophosphorus acid, carboxylic acid, and organophosphinic acid. However, when cobalt is separated by this extraction method from the above-described acidic solution obtained by subjecting nickel oxide ore to leaching with sulfuric acid, since the acidic solution also contains a high concentration of manganese, there is a problem that part of cobalt is extracted together with manganese and lost due to variations in operation conditions or part of manganese forms an oxide precipitate and the precipitate interferes with operations in the process of solvent extraction.

CITATION LIST

Patent Literatures

Patent Literature 1: JP-A-7-108281
Patent Literature 2: US Patent Application Publication No. US2004/0050212

SUMMARY OF INVENTION

Technical Problem

In view of the above conventional problems, it is an object of the present invention to provide a method capable of easily and efficiently removing manganese from an aqueous acidic solution of sulfuric acid containing cobalt and manganese at low cost to obtain a high-purity cobalt sulfate aqueous solution usable as a raw material for lithium ion secondary batteries.

Solution to Problem

In order to achieve the above object, according to the present invention, there is provided a method for producing a cobalt sulfate aqueous solution from an aqueous acidic solution of sulfuric acid containing cobalt and manganese, the method including mixing the aqueous acidic solution of sulfuric acid containing cobalt and manganese with an acidic organic extractant while adjusting a pH of the aqueous acidic solution of sulfuric acid in a range between 2 and 4 to extract manganese.

In the method for producing a cobalt sulfate aqueous solution according to the present invention, the acidic organic extractant mainly contains di-2-ethylhexyl phosphate. Further, it is preferable that the acidic organic extractant is diluted with a diluent so that a concentration of di-2-ethylhexyl phosphate in the acidic organic extractant is 10 to 30 vol %.

In the method for producing a cobalt sulfate aqueous solution according to the present invention, it is preferable that when further containing copper, the aqueous acidic solution of sulfuric acid is mixed with an acidic organic extractant while the pH of the aqueous acidic solution of sulfuric acid is adjusted to a value in a range between 2.6 and 4 to extract copper together with manganese.

Further, in the method for producing a cobalt sulfate aqueous solution according to the present invention, after manganese is extracted from the aqueous acidic solution of sulfuric acid containing cobalt and manganese using the acidic organic extractant, the acidic organic extractant is washed with water while pH is adjusted to at least 2.1 to recover cobalt extracted into the acidic organic extractant by back-extraction into an aqueous phase.

Further, in the method for producing a cobalt sulfate aqueous solution according to the present invention, it is preferable that the pH of the aqueous acidic solution of sulfuric acid is adjusted using at least one pH adjuster selected from sodium hydroxide, potassium hydroxide, magnesium oxide, magnesium hydroxide, and an aqueous ammonia solution. Furthermore, it is preferable that the aqueous acidic solution of sulfuric acid has a cobalt concentration of 70 to 100 g/L and a manganese concentration of 0.05 to 1.0 g/L.

Effects of Invention

According to the present invention, it is possible to easily and efficiently separate and remove manganese as an impurity from an aqueous acidic solution of sulfuric acid containing cobalt and manganese at low cost by a simple method. Further, it is also possible to easily separate and remove manganese also from an aqueous acidic solution of sulfuric acid containing a high concentration of cobalt without using an expensive oxidizer or a chlorine-based oxidizer and to suppress the loss of cobalt due to coprecipitation.

Therefore, the high-purity cobalt sulfate aqueous solution obtained by the present invention contains a very low concentration of manganese and no chlorine and is therefore suitable as a raw material for lithium ion secondary batteries. Further, cobalt slightly extracted into the organic phase together with impurities such as manganese etc. can be back-extracted into an aqueous phase by washing, which makes it possible to reduce the amount of cobalt lost without being recovered.

DESCRIPTION OF EMBODIMENTS

Figure 1:
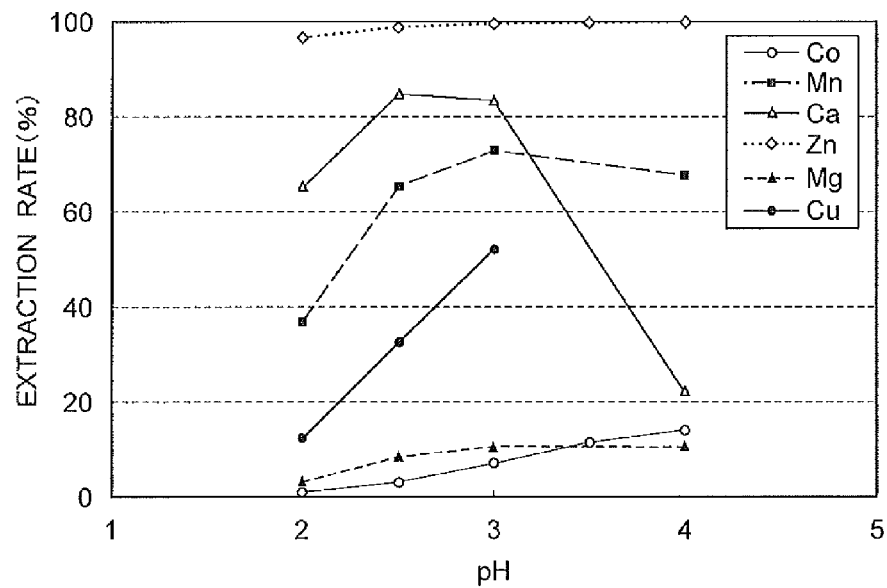
FIG. 1 A graph showing the relationship between the pH of an aqueous acidic solution of sulfuric acid containing cobalt and manganese and the extraction rate of each element in Example 2.

According to a method for producing a cobalt sulfate aqueous solution of the present invention, when an aqueous acidic solution of sulfuric acid containing cobalt and manganese as an impurity (aqueous phase) and an acidic organic extractant (organic phase) are brought into contact with each other, a pH adjuster is added to adjust the pH of the aqueous phase to a value in a range between 2 and 4 to selectively extract manganese in the aqueous phase into the organic phase to recover a high-purity cobalt sulfate aqueous solution having a low manganese concentration as an aqueous phase.

If the pH of the aqueous acidic solution of sulfuric acid is less than 2 during the extraction, manganese can hardly be extracted. On the other hand, if the pH exceeds 4, cobalt is more likely to be extracted into the organic phase together with manganese, which makes it difficult to separate manganese and cobalt from each other. Further, if the pH exceeds 4, there is a fear that an impurity, other than manganese, forms a hydroxide so that crud is formed during solvent extraction and therefore operation becomes difficult.

It is to be noted that cobalt is more likely to be extracted when the pH exceeds about 3, and therefore the pH is preferably maintained at a value in a range between 2 and 3 to completely suppress the extraction of cobalt. Further, when the aqueous acidic solution of sulfuric acid contains copper in addition to manganese etc., copper can be extracted into the organic phase together with manganese by mixing the aqueous acidic solution of sulfuric acid with the acidic organic extractant while adjusting the pH of the aqueous acidic solution of sulfuric acid to a value in a range between 2.6 and 4.

As the pH adjuster used to adjust pH, one that forms a water-soluble sulfate after pH adjustment is suitable.

Examples of such a pH adjuster include sodium hydroxide, potassium hydroxide, magnesium oxide, magnesium hydroxide, and an aqueous ammonia solution. Sodium hydroxide, potassium hydroxide, magnesium oxide, or magnesium hydroxide may be used in solid form, but is preferably used as an aqueous solution. It is to be noted that magnesium oxide is dissolved in water to form an aqueous magnesium hydroxide solution. When an aqueous ammonia solution is used as the pH adjuster, an economically excellent process is achieved because the amount of chemical agent to be used can be reduced by providing an ammonia recovery process as a subsequent process.

On the other hand, one that forms insoluble gypsum after pH adjustment such as calcium hydroxide or calcium oxide is not preferred as the pH adjuster because formed gypsum becomes the cause of contamination of cobalt metal or cobalt sulfate finally obtained from the cobalt sulfate aqueous solution. It is to be noted that there is a case where an alkali is added to separate another impurity or adjust pH to a value suitable for solvent extraction in the process of obtaining the aqueous acidic solution of sulfuric acid containing cobalt and manganese used as a raw material in the method according to the present invention.

As the acidic organic extractant, an organophosphorus acid-based acidic organic extractant is preferred, and an extractant mainly containing di-2-ethylhexyl phosphate having a high ability to extract zinc, iron, calcium, etc. is particularly preferred. An example of such an acidic organic extractant commercially available and mainly containing di-2-ethylhexyl phosphate includes DP-8R (trade name) manufactured by Daihachi Chemical Industry Co., Ltd.

When used, the acidic organic extractant is preferably diluted with a diluent so that the concentration of di-2-ethylhexyl phosphate as its main component in the organic phase (acidic organic extractant) is 10 to 30 vol %. It is to be noted that the diluent is not particularly limited, and for example, various hydrocarbon-based diluents such as TECLEAN N-20 (trade name) manufactured by Nippon Oil Corporation can be used.

The reason why the concentration of di-2-ethylhexyl phosphate in the organic phase (acidic organic extractant) is adjusted to 10 to 30 vol % when di-2-ethylhexyl phosphate is used as the acidic organic extractant is that if the concentration of di-2-ethylhexyl phosphate is lower than 10 vol %, the amount of manganese to be extracted per unit amount of extractant is small, which creates the necessity to increase the capacity of equipment. On the other hand, if the concentration of di-2-ethylhexyl phosphate exceeds 30 vol %, the viscosity of the organic phase increases, which is disadvantageous because operation becomes unstable due to poor separation between the organic phase and the aqueous phase so that productivity is reduced. In order to stably and reliably perform treatment, the concentration of di-2-ethylhexyl phosphate is more preferably set to a value in a range between 15 and 25 vol %.

By performing the extraction using the acidic organic extractant, an impurity such as manganese can be extracted from the aqueous acidic solution of sulfuric acid containing cobalt and manganese into the organic phase (acidic organic extractant) while extraction of cobalt is suppressed. However, cobalt in the aqueous acidic solution of sulfuric acid is even partially extracted into the organic phase, and therefore there is a case where the extracted cobalt is lost and the recovery rate of cobalt is reduced if nothing is done. In such a case, the cobalt extracted into the acidic organic extractant can be recovered by selective back-extraction into an aqueous phase by washing the acidic organic extractant after extraction (organic phase after extraction) with water while adjusting pH to at least 2.1.

When the acidic solution of sulfuric acid containing cobalt and manganese further contains copper as an impurity, copper can be extracted together with manganese by mixing the aqueous acidic solution of sulfuric acid with the acidic organic extractant while adjusting the pH of the aqueous acidic solution of sulfuric acid to a value in a range between 2.6 and 4. It is to be noted that in this case, the recovery rate of copper is increased by adjusting pH to at most 2.1 when cobalt is selectively back-extracted into an aqueous phase by washing the acidic organic extractant after extraction with water in such a manner as described above, which is seemingly preferred. However, in real operation, the recovered liquid is generally often returned to the extraction stage and treated so that a water balance is achieved. Therefore, caution is required because there is a fear that copper accumulates unless copper is taken out of the system.

In the extraction of manganese into the organic extractant, the back-extraction of cobalt into an aqueous solution, and the washing of the organic extractant to remove impurities contained therein, which is called scrubbing, the optimum range of the ratio of the amount of liquid (O/A) between the organic extractant (O) and the acidic solution of sulfuric acid (A) to be brought into contact with the organic extractant or the optimum ranges of the supply amount of each of the liquids, contact time, liquid temperature, etc. in the case where continuous equipment is used may be appropriately selected through a verification test or real operation in consideration of the scale of equipment used, cost, or the stability of reaction. In general, the ratio O/A in the extraction or the back-extraction varies depending on the concentration of a target solution, but is appropriately in a range between about 10 and 0.1 centered around 1. Further, the reaction can smoothly proceed when the temperature is about 30 to 45° C. and the contact time is about several minutes to 1 hour.

The aqueous acidic solution of sulfuric acid used as a starting material in the present invention contains cobalt and manganese, and the concentration of cobalt in the aqueous acidic solution of sulfuric acid is preferably in a range between 70 and 100 g/L and the concentration of manganese in the aqueous acidic solution of sulfuric acid is preferably in a range between 0.05 and 1.0 g/L. Such an aqueous acidic solution of sulfuric acid is not particularly limited, and an example thereof includes an acidic solution of sulfuric acid obtained by subjecting nickel ore or a discarded lithium ion secondary battery to leaching with sulfuric acid to obtain a leachate, subjecting a mixed sulfide obtained by sulfurizing the leachate to leaching with sulfuric acid to obtain a solution, and separating nickel from the solution by solvent extraction.

A reaction apparatus used to carry out the method according to the present invention is not particularly limited, and various types of multistage countercurrent reaction tanks can be appropriately used as long as contact and separation between the organic phase and the aqueous phase can be efficiently performed. In view of industrial efficiency, continuous multistage countercurrent extraction tanks such as a multistage countercurrent mixer settler is preferably used.

In the case of operation using multistage countercurrent extraction tanks, an organic phase composed of the acidic organic extractant is supplied to a first state and an aqueous phase composed of the aqueous acidic solution of sulfuric acid to be purified is supplied to a final stage, and the organic phase and the aqueous phase are countercurrently brought into contact with each other while the pH in the multistage countercurrent extraction tanks is maintained at a value in a range between 2 and 4 by supplying an alkali such as sodium hydroxide to each stage. The number of stages required for extraction may be appropriately selected based on the concentration of manganese in the aqueous acidic solution of sulfuric acid or a target concentration. A high-purity cobalt sulfate aqueous solution after purification is obtained from the first stage and an organic phase containing manganese after the completion of reaction is obtained from the final stage.

EXAMPLES

Example 1

The aqueous acidic solution of sulfuric acid as an aqueous phase was prepared using reagents of metal sulfates to have a composition shown in a row labeled "starting liquid" in the following Table 1, and its pH was adjusted to 2.5 using an aqueous sodium hydroxide solution. The acidic organic extractant used as an organic phase was prepared by diluting di-2-ethylhexyl phosphate (manufactured by Daihachi Chemical Industry Co., Ltd under the trade name of "DP-8R") with a diluent (manufactured by Nippon Oil Corporation under the trade name of "TECLEAN N20") to a concentration of 20 vol %.

Four batches of the aqueous acidic solution of sulfuric acid (aqueous phase) and four batches of the acidic organic extractant (organic phase) were prepared, and the aqueous phase and the organic phase were subjected to extraction treatment by a method resembling four-stage countercurrent extraction. More specifically, the aqueous phase (O) and the organic phase (A) were placed in a 300-mL beaker in a volume ratio of 1:1 (O/A=1) and stirred with a stirrer while the temperature of the liquid was maintained at 40° C. using a water bath to perform first-stage extraction. The stirring extraction was continued for 20 minutes, and then stirring was stopped and the liquid was allowed to stand to separate into an organic phase and an aqueous phase. Each of the obtained aqueous phase and organic phase was sampled to analyze ions of metals by ICP.

The aqueous phase after the sampling was brought into contact with a fresh organic phase to perform treatment as second-stage extraction in the same manner as described above, and on the other hand, the organic phase after the sampling was bought into contact with a fresh aqueous phase to perform treatment in the same manner as described above. This operation was repeated four times to perform treatment resembling four-stage countercurrent extraction. This means that in this treatment, the aqueous phase subjected to the first-stage extraction was brought into contact with the organic phase only once, but the aqueous phase subjected to the second-stage extraction, the aqueous phase subjected to the third-stage extraction, and the aqueous phase subjected to the fourth-stage extraction were brought into contact with the organic phase twice, three times, and four times, respectively.

The concentrations of cobalt and impurity components such as manganese etc. of each of the aqueous phases, obtained in the first to fourth-stage extraction, determined by the ICP analysis are shown in rows labeled "first-stage extraction" to "fourth-stage extraction" in the following Table 1, respectively. Further, the concentrations of cobalt and impurity components such as manganese etc. of each of the organic phases, obtained in the first- to fourth-stage extraction, determined by the ICP analysis are shown in rows labeled "first-stage extraction" to "fourth-stage extraction" in the following Table 2, respectively.

TABLE 1

| | Aqueous Phase (g/L) | | | | | |
| --- | --- | --- | --- | --- | --- | --- |
| | Co | Zn | Mn | Mg | Ca | Cu |
| Starting Liquid | 102 | 0.38 | 0.38 | 0.38 | 0.37 | 0.44 |
| First-Stage Extraction | 99.7 | 0.003 | 0.23 | 0.40 | 0.09 | 0.44 |
| Second-Stage Extraction | 98.1 | <0.001 | 0.10 | 0.39 | 0.016 | 0.38 |
| Third-Stage Extraction | 96.8 | <0.001 | 0.036 | 0.38 | 0.002 | 0.28 |
| Fourth-Stage Extraction | 94.8 | <0.001 | 0.012 | 0.35 | <0.001 | 0.20 |

TABLE 2

| | Organic Phase (g/L) | | | | | |
| --- | --- | --- | --- | --- | --- | --- |
| | Co | Zn | Mn | Mg | Ca | Cu |
| Starting Liquid | — | — | — | — | — | — |
| First-Stage Extraction | 2.7 | 0.43 | 0.39 | 0.025 | 0.42 | 0.14 |
| Second-Stage Extraction | 3.3 | 0.003 | 0.21 | 0.032 | 0.069 | 0.15 |
| Third-Stage Extraction | 3.4 | <0.001 | 0.071 | 0.036 | 0.014 | 0.12 |
| Fourth-Stage Extraction | 3.1 | <0.001 | 0.024 | 0.033 | 0.003 | 0.08 |

As can be seen from the results shown in the above Tables 1 and 2, the concentration of manganese in the aqueous acidic solution of sulfuric acid (starting liquid) as an aqueous phase was 0.38 g/L but could be reduced to 0.012 g/L by reaction resembling four-stage countercurrent extraction. That is, the ratio of manganese to cobalt could be reduced to at most one-thirtieth of that of the starting liquid, and a high-purity cobalt sulfate aqueous solution usable for batteries could be obtained.

It is to be noted that the acidic organic extractant as an organic phase containing extracted impurities such as manganese etc. and part of cobalt may be subjected to scrubbing or back-extraction by bringing it into contact with pure water or sulfuric acid or the like to separate the impurities from the organic phase, which makes it possible to use the organic phase again for extraction.

Example 2

An aqueous acidic solution of sulfuric acid containing cobalt and manganese and an acidic organic extractant were brought into contact with each other to confirm the extraction rates of impurities such as manganese etc. into an organic phase. The aqueous acidic solution of sulfuric acid as an aqueous phase was prepared using reagents of metal sulfates to have a composition shown in the following Table 3, and its pH was adjusted to a value in a range between 2.0 and 4.0 with an aqueous sodium hydroxide solution to prepare, as starting liquids, five batches of the aqueous acidic solution of sulfuric acid different in pH. On the other hand, the acidic organic extractant used as an organic phase was prepared in the same manner as in Example 1 by diluting di-2-ethylhexyl phosphate with a diluent to a concentration of 20 vol %.

TABLE 3

| Aqueous Phase (g/L) | | | | | |
| --- | --- | --- | --- | --- | --- |
| Co | Zn | Mn | Mg | Ca | Cu |
| 99 | 0.38 | 0.39 | 0.39 | 0.37 | 0.006 |

The aqueous phase and the organic phase were placed in a 300-mL beaker in a volume ratio of 1:1 and stirred with a stirrer while the temperature of the liquid was maintained at 40° C. using a water bath to perform extraction. The stirring extraction was continued for 20 minutes, and then the stirring was stopped and the liquid was allowed to stand to separate into an organic phase and an aqueous phase. Each of the obtained aqueous phase and organic phase was sampled to analyze ions of metals by ICP, and the extraction rates of each of the metals at different pHs were determined and shown in FIG. 1. It is to be noted that the extraction rate was determined as a difference between the amount of a material contained in the starting liquid as an aqueous phase and the amount of the material contained in an aqueous phase after extraction treatment calculated based on the analysis value and liquid amount of the aqueous phase after extraction treatment, that is, as the rate of extraction of a material from an aqueous phase into an organic phase.

As can be seen from FIG. 1, the extraction rate of manganese significantly increased as the pH increased from 2, whereas the extraction rate of cobalt slightly increased when the pH was around 4 but was suppressed to a low level. From this, it has been confirmed that cobalt and manganese contained in the aqueous acidic solution of sulfuric acid can be efficiently separated from each other by adjusting the pH to be in a range between 2 and 4.

Comparative Example 1

The distribution of cobalt and manganese was confirmed by the same experimental method as in Example 2 except that the pHs during extraction were changed to 1.0, 1.5, 4.5 and 5.0. It is to be noted that as the starting liquids, four batches of an aqueous acidic solution of sulfuric acid having a composition shown in the above Table 3 were used.

As a result, when the pH was 1.0 or 1.5, the extraction rate of manganese was almost 0%. On the other hand, when the pH was 4.5 or 5.0, at least 15% of cobalt was extracted together with manganese, that is, the loss of cobalt was increased.

Example 3

An aqueous acidic solution of sulfuric acid containing cobalt and manganese and an acidic organic extractant were brought into contact with each other to confirm the extraction rates of impurities such as manganese etc. into an organic phase. The aqueous acidic solution of sulfuric acid as an aqueous phase was prepared using reagents of metal sulfates to have a composition shown in the following Table 4, and its pH was adjusted to a value in a range between 2.0 and 4.0 using an aqueous ammonia solution to prepare, as starting liquids, five batches of the aqueous acidic solution of sulfuric acid different in pH. On the other hand, the acidic organic extractant used as an organic phase was prepared in the same manner as in Example 1 by diluting di-2-ethylhexyl phosphate with a diluent to a concentration of 20 vol %.

TABLE 4

| Aqueous Phase (g/L) | | | | | |
|---|---|---|---|---|---|
| Co | Zn | Mn | Mg | Ca | Cu |
| 100 | 0.37 | 0.40 | 0.37 | 0.38 | 0.44 |

Five 300-mL beakers were prepared, and 100 mL of the aqueous phase and 100 mL of the organic phase were placed in each of the beakers in a volume ratio of 1:1. The temperature of the liquid in each of the beakers was maintained at 40° C. using a water bath, and at the same time, an aqueous ammonia solution was added to the liquid while the liquid was stirred with a stirrer to perform extraction. At this time, the amount of the aqueous ammonia solution to be added was adjusted so that an aqueous phase after extraction had a pH of 2.0 to 4.0. The stirring and extraction were continued for 20 minutes, and then the stirring was stopped and the liquid was allowed to stand to separate into an organic phase and an aqueous phase. The obtained aqueous phase and organic phase were sampled to analyze ions of metals by ICP and the extraction rates of each of the metals at different pHs were determined and shown in FIG. 2. It is to be noted that the extraction rate was determined as a difference between the amount of a material contained in the starting liquid as an aqueous phase and the amount of the material contained in an aqueous phase after extraction treatment calculated based on the analysis value and liquid amount of the aqueous phase after extraction treatment, that is, as the rate of extraction of a material from an aqueous phase into an organic phase.

Figure 2:
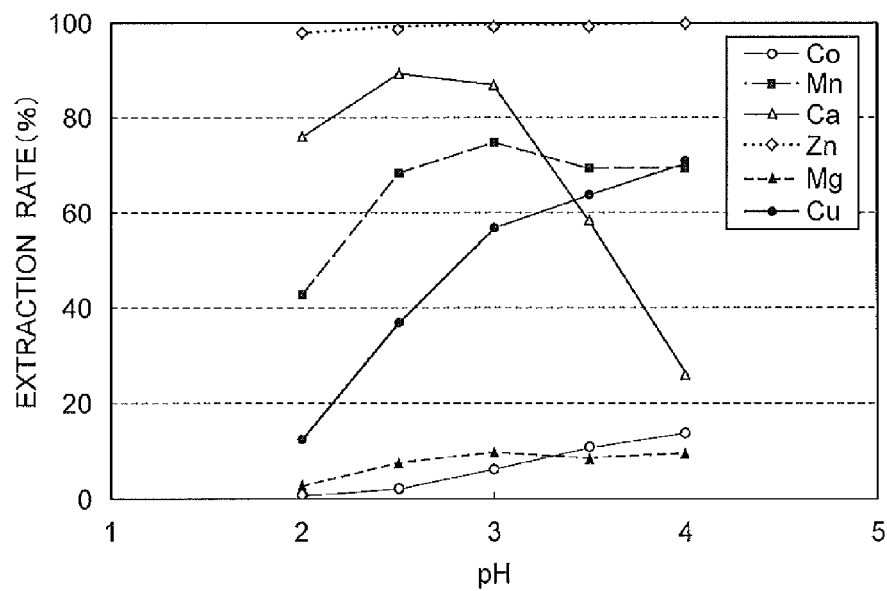
FIG. 2 A graph showing the relationship between the pH of an aqueous acidic solution of sulfuric acid containing cobalt and manganese and the extraction rate of each element in Example 3.

As can be seen from FIGS. 1 and 2, also when an aqueous ammonia solution was used as a pH adjuster, as in the case of using sodium hydroxide, the extraction rate of manganese significantly increased as the pH increased from 2.0, whereas the extraction rate of cobalt slightly increased when the pH was around 4.0 but was suppressed to a low level. From this, it has been confirmed that, also when an aqueous ammonia solution is used as a pH adjuster, as in the case of using sodium hydroxide, cobalt and manganese contained in the aqueous acidic solution of sulfuric acid can be efficiently separated from each other by adjusting the pH to be in a range between 2 and 4.

Example 4

An aqueous acidic solution of sulfuric acid containing cobalt and manganese and an acidic organic extractant were brought into contact with each other to confirm the distribution of impurities such as manganese etc. to an aqueous phase and an organic phase. The aqueous acidic solution of sulfuric acid as an aqueous phase was prepared as a starting liquid by using reagents of metal sulfates to have a composition shown in the following Table 5, and its pH was adjusted using an aqueous sodium hydroxide solution. The acidic organic extractant used as an organic phase was prepared by diluting di-2-ethylhexyl phosphate (manufactured by Daihachi Chemical Industry Co., Ltd under the trade name of "DP-8R") with a diluent (manufactured by Nippon Oil Corporation under the trade name of "TECLEAN N20") to a concentration of 20 vol %.

TABLE 5

| Starting Liquid (g/L) | | | | | |
|---|---|---|---|---|---|
| Co | Mn | Ca | Zn | Mg | Cu |
| 72 | 0.05 | 0.049 | 0.05 | 0.093 | 0.049 |

The aqueous acidic solution of sulfuric acid (aqueous phase) and the acidic organic extractant (organic phase) were subjected to extraction treatment using a four-stage mixer settler for countercurrent extraction. More specifically, the aqueous phase (O) and the organic phase (A) were placed in a mixer settler having a capacity of 3 L in a volume ratio of 1:1 (O/A=1), and the mixer settler was continuously operated while the temperature of the liquid was maintained at 40° C. using a water bath and pH adjustment was performed by adding a sodium hydroxide solution or a sulfuric acid solution to obtain an aqueous phase and an organic phase.

Each of the obtained aqueous phase and organic phase was sampled to analyze ions of metals by ICP, and the extraction rate of each of the metals was calculated using the concentrations of the metal in the obtained aqueous phase and organic phase. The relationship between the obtained extraction rate and pH is shown in the following Table 6 and FIG. 3. It is to be noted that the extraction rate was calculated by dividing the amount of an extracted material by the amount of the material contained in the starting liquid.

TABLE 6

| | Extraction Rate (%) | | | | | |
|---|---|---|---|---|---|---|
| pH | Co | Mn | Ca | Zn | Mg | Cu |
| 1.9 | 2.1 | 85.6 | 97.5 | 97.5 | 19.3 | 22.1 |
| 2.0 | 4.0 | 91.5 | 97.5 | 97.5 | 23.3 | 27.7 |
| 2.1 | 4.2 | 95.3 | 97.5 | 97.5 | 25.1 | 38.6 |
| 2.2 | 5.0 | 95.3 | 98.1 | 97.5 | 21.6 | 37.9 |
| 2.3 | 6.8 | 96.8 | 99.2 | 97.5 | 23.2 | 51.5 |
| 2.4 | 4.0 | 96.4 | 98.3 | 97.4 | 17.4 | 55.6 |
| 2.5 | 4.3 | 97.3 | 98.1 | 98.2 | 19.8 | 55.8 |
| 2.6 | 4.7 | 97.4 | 97.5 | 97.5 | 32.3 | 75.5 |

Figure 3:
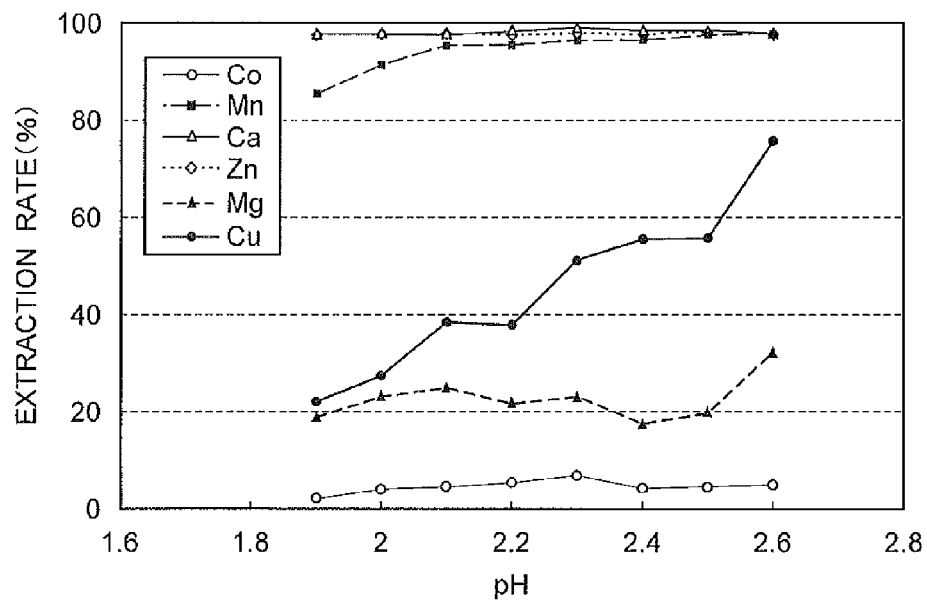
FIG. 3 A graph showing the relationship between the pH of an aqueous acidic solution of sulfuric acid containing cobalt and manganese and the extraction rate of each element in Example 4.

As can be seen from the above Table 6 and FIG. 3, cobalt and manganese in the aqueous acidic solution of sulfuric acid could be efficiently separated as the pH increased from 2, and in addition, when the pH was at least 2.6, copper was also efficiently extracted into the organic phase and therefore efficiently separated from cobalt.

The results of Example 4 shown in FIG. 3 are the results of continuous test of four-stage countercurrent extraction, and therefore the degree of purification is improved due to the increase of the number of stages. Therefore, the values themselves of the extraction rate are different from those shown in FIG. 1 as the results of single-stage extraction in Example 2, but it is found that all the impurities show the same tendency.

Example 5

An acidic organic extractant containing cobalt etc. extracted from an aqueous acidic solution of sulfuric acid containing cobalt and manganese was brought into contact with water to confirm the distribution of impurities such as manganese etc. to an aqueous phase and an organic phase by back-extraction. As the acidic organic extractant after extraction used as a starting liquid, the organic phase after extraction (organic phases before back-extraction) obtained in Example 4 and ranging in composition as shown in the following Table 7 was used.

TABLE 7

| Organic Phase before Back-Extraction (g/L) | | | | | |
|---|---|---|---|---|---|
| Co | Mn | Ca | Zn | Mg | Cu |
| 1.0~3.7 | 0.047~0.14 | 0.049~0.14 | 0.043~0.061 | 0.005~0.018 | 0.03~0.057 |

The organic phase before back-extraction (organic phase) was subjected to washing treatment (back-extraction treatment) using a four-stage mixer settler for countercurrent extraction. More specifically, the aqueous phase (O) and the organic phase (A) were placed in a mixer settler having a capacity of 3 L in a volume ratio of 5:1 (O/A=5), and the mixer settler was continuously operated while the temperature of the liquid was maintained at 40° C. using a water bath and pH adjustment was performed by adding a sodium hydroxide solution or a sulfuric acid solution to obtain an aqueous phase and an organic phase.

Each of the obtained aqueous phase and organic phase was sampled to analyze ions of metals by ICP, and the concentrations of each of the metals in the obtained aqueous phase and organic phase were used to calculate the recovery rate of each of cobalt and impurity components such as manganese etc. into the aqueous phase. The relationship between the obtained recovery rate and pH is shown in the following Table 8 and FIG. 4. It is to be noted that the recovery rate was calculated as percentage by dividing the amount of a metal in a final liquid after washing by the total amount of the metal in the organic phase after washing and the final liquid after washing.

TABLE 8

| | Recovery Rate (%) | | | | | |
|---|---|---|---|---|---|---|
| pH | Co | Mn | Ca | Zn | Mg | Cu |
| 1.9 | 99.2 | 9.7 | 2.1 | 0.4 | — | 37.6 |
| 2.0 | 99.1 | 6.4 | 0.9 | 0.0 | 86.1 | 28.1 |
| 2.1 | 99.0 | 3.1 | 0.9 | — | 72.0 | 15.7 |
| 2.2 | 98.5 | 2.7 | 0.6 | — | 62.3 | 13.9 |
| 2.3 | 96.4 | 3.5 | — | — | 63.9 | 16.8 |
| 2.4 | 94.4 | 3.4 | 1.0 | 0.1 | 58.2 | 14.8 |

Figure 4:
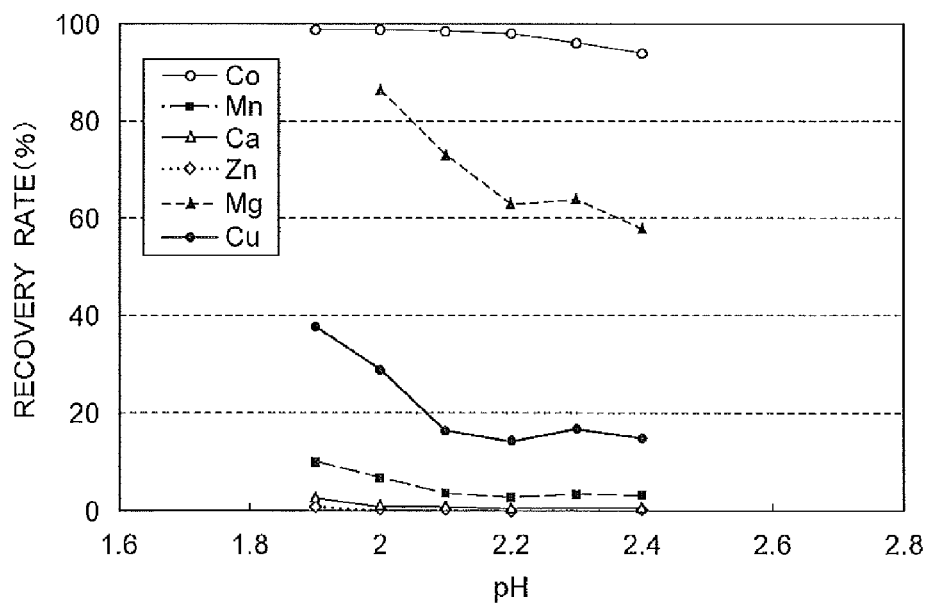
FIG. 4 A graph showing the relationship between the pH of an acidic organic extractant after extraction and the recovery rate of each element back-extracted into an aqueous phase in Example 5.

As can be seen from the results shown in Table 8 and FIG. 4, cobalt slightly extracted into the organic phase together with impurities such as manganese etc. in the process of extraction was selectively back-extracted into an aqueous phase by washing the organic phase with water at a pH of at least 2.1 and efficiently separated from the impurities such as manganese etc., and as a result, cobalt could be effectively recovered.

The invention claimed is:

1. A method for producing a cobalt sulfate aqueous solution from an aqueous acidic solution of sulfuric acid containing cobalt, manganese, copper and calcium, the method comprising mixing the aqueous acidic solution of sulfuric acid with an acidic organic extractant to extract manganese and calcium by adjusting a pH of the aqueous acidic solution of sulfuric acid in a range between 2 and 3.5,
   wherein the aqueous acidic solution of sulfuric acid containing cobalt, manganese, copper and calcium is prepared by subjecting a discarded lithium ion secondary battery to leaching with sulfuric acid to obtain a leachate, sulfurizing the leachate to obtain a sulfide, subjecting the sulfide to leaching with sulfuric acid to acquire a solution, and separating nickel from the acquired solution by solvent extraction.

2. The method for producing a cobalt sulfate aqueous solution according to claim 1, wherein the acidic organic extractant containing di-2-ethylhexyl phosphate.

3. The method for producing a cobalt sulfate aqueous solution according to claim 2, wherein the acidic organic extractant is diluted with a diluent so that a concentration of di-2-ethylhexyl phosphate in the acidic organic extractant is 10 to 30 vol %.

4. The method for producing a cobalt sulfate aqueous solution according to claim 1, wherein after manganese and calcium is extracted from the aqueous acidic solution of sulfuric acid containing cobalt, manganese, copper and calcium using the acidic organic extractant, the acidic organic extractant is washed with water while pH is adjusted to equal to or more than 2.1 to recover cobalt extracted into the acidic organic extractant by back-extraction into an aqueous phase.

5. The method for producing a cobalt sulfate aqueous solution according to claim 1, wherein the pH of the aqueous acidic solution of sulfuric acid is adjusted by using at least one pH adjuster selected from sodium hydroxide, potassium hydroxide, magnesium oxide, magnesium hydroxide, and an aqueous ammonia solution.

6. The method for producing a cobalt sulfate aqueous solution according to claim 1, wherein the aqueous acidic solution of sulfuric acid has a cobalt concentration of 70 to 100 g/L and a manganese concentration of 0.05 to 1.0 g/L.

7. The method for producing a cobalt sulfate aqueous solution according to claim 1, wherein a multi-stage countercurrent extraction tank is used, the aqueous acidic solution of sulfuric acid containing cobalt, manganese, copper and calcium is supplied to a final stage of the extraction tank and the acidic organic extractant is supplied to a first stage of the extraction tank, and an alkali is supplied to each stage of the extraction tank to maintain a pH in the multi-stage countercurrent extraction tanks to a value in a range between 2 and 3.5.

8. A method for producing a cobalt sulfate aqueous solution from an aqueous acidic solution of sulfuric acid containing cobalt, manganese, copper and calcium, the method comprising mixing the aqueous acidic solution of sulfuric acid with an acidic organic extractant to extract manganese and copper by adjusting a pH of the aqueous acidic solution of sulfuric acid in a range between 3.5 and 4, the aqueous acidic solution of sulfuric acid containing cobalt manganese, copper and calcium is prepared by subjecting a discarded lithium ion secondary battery to leaching with sulfuric acid to obtain a leachate, sulfurizing the leachate to obtain a sulfide, subjecting the sulfide to leaching with sulfuric acid to acquire a solution, and separating nickel from the acquired solution by solvent extraction.

9. The method for producing a cobalt sulfate aqueous solution according to claim 8, wherein the acidic organic extractant containing di-2-ethylhexyl phosphate.

10. The method for producing a cobalt sulfate aqueous solution according to claim 9, wherein the acidic organic extractant is diluted with a diluent so that a concentration of di-2-ethylhexyl phosphate in the acidic organic extractant is 10 to 30 vol %.

11. The method for producing a cobalt sulfate aqueous solution according to claim 8, wherein after manganese and copper is extracted from the aqueous acidic solution of sulfuric acid containing cobalt, manganese, copper and calcium using the acidic organic extractant, the acidic organic extractant is washed with water while pH is adjusted to equal to or more than 2.1 to recover cobalt extracted into the acidic organic extractant by back-extraction into an aqueous phase.

12. The method for producing a cobalt sulfate aqueous solution according to claim 8, wherein the pH of the aqueous acidic solution of sulfuric acid is adjusted by using at least one pH adjuster selected from sodium hydroxide, potassium hydroxide, magnesium oxide, magnesium hydroxide, and an aqueous ammonia solution.

13. The method for producing a cobalt sulfate aqueous solution according to claim 8, wherein the aqueous acidic solution of sulfuric acid has a cobalt concentration of 70 to 100 g/L and a manganese concentration of 0.05 to 1.0 g/L.

14. The method for producing a cobalt sulfate aqueous solution according to claim 8, wherein a multi-stage countercurrent extraction tank is used, the aqueous acidic solution of sulfuric acid containing cobalt, manganese, copper and calcium is supplied to a final stage of the extraction tank and the acidic organic extractant is supplied to a first stage of the extraction tank, and an alkali is supplied to each stage of the extraction tank to maintain a pH in the multi-stage countercurrent extraction tanks to a value in a range between 3.5 and 4.

* * * * *